(12) United States Patent
Viquez Calderon

(10) Patent No.: US 10,459,729 B2
(45) Date of Patent: Oct. 29, 2019

(54) MAP TABLES FOR HARDWARE TABLES

(71) Applicant: HEWLETT PACKARD ENTERPRISE DEVELOPMENT LP, Houston, TX (US)

(72) Inventor: Claudio Enrique Viquez Calderon, San Jose (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 424 days.

(21) Appl. No.: 15/507,307

(22) PCT Filed: Apr. 28, 2015

(86) PCT No.: PCT/US2015/028042
§ 371 (c)(1),
(2) Date: Feb. 28, 2017

(87) PCT Pub. No.: WO2016/175768
PCT Pub. Date: Nov. 3, 2016

(65) Prior Publication Data
US 2017/0308828 A1 Oct. 26, 2017

(51) Int. Cl.
*G06F 9/38* (2018.01)
(52) U.S. Cl.
CPC .................................. *G06F 9/38* (2013.01)
(58) Field of Classification Search
CPC ............ G06F 9/38; H04L 41/20; H04L 45/54
See application file for complete search history.

(56) References Cited

U.S. PATENT DOCUMENTS

| 8,966,035 | B2* | 2/2015 | Casado ................. H04L 49/00 709/223 |
| 2010/0274961 | A1 | 10/2010 | Golla et al. |
| 2012/0011299 | A1 | 1/2012 | Mylly |
| 2014/0016476 | A1 | 1/2014 | Dietz et al. |
| 2014/0029451 | A1 | 1/2014 | Nguyen |
| 2014/0146674 | A1 | 5/2014 | Wang et al. |
| 2014/0241357 | A1 | 8/2014 | Liu et al. |
| 2014/0281380 | A1 | 9/2014 | Inder et al. |
| 2014/0334489 | A1* | 11/2014 | Bosshart ................. H04L 47/56 370/392 |
| 2016/0072850 | A1* | 3/2016 | Zhang ................... H04L 63/306 726/12 |

(Continued)

OTHER PUBLICATIONS

International Search Report and Written Opinion, International Application No. PCT/US2015/028042, dated Aug. 31, 2015, pp. 1-8, KIPO.

(Continued)

*Primary Examiner* — Min Jung
(74) *Attorney, Agent, or Firm* — Hewlett Packard Enterprise Patent Department

(57) ABSTRACT

In one implementation, a system for maintaining a flow pipeline includes a logical table interface engine to expose an interface to receive a maintenance request regarding a flow pipeline of a network element, a map engine to maintain an entry in a first hardware table based on an action of the maintenance request associated with a logical flow table, and a hardware table engine to maintain the second hardware table of the network element based on the entry in the first hardware table.

15 Claims, 4 Drawing Sheets

(56) References Cited

U.S. PATENT DOCUMENTS

| | | | |
|---|---|---|---|
| 2016/0205041 A1* | 7/2016 | Lee | H04L 45/38 |
| | | | 709/226 |
| 2017/0034058 A1* | 2/2017 | Sampath | H04L 12/6418 |
| 2017/0046160 A1* | 2/2017 | Seth | G06F 9/384 |
| 2017/0060593 A1* | 3/2017 | Krishna | G06F 9/30105 |
| 2017/0070416 A1* | 3/2017 | Narayanan | H04L 45/02 |
| 2018/0248770 A1* | 8/2018 | Regmi | H04L 67/34 |

OTHER PUBLICATIONS

Wolfgang Braun and Michael Menth, "Software-Defined Networking Using OpenFlow: Protocols, Applications and Architectural Design Choices," Future Internet, May 12, 2014, pp. 302-336, University of Tuebingen, Germany.

* cited by examiner

MAP TABLES FOR HARDWARE TABLES

BACKGROUND

Electronic devices, such as computers, commonly communicate across network infrastructure, where network elements provide a path of communication from one device to another. For example, the network infrastructure can include switches and routers as connection points in a path from one host device to another host device. Services related to the computing industry can be offered over a network of devices to route the service from one location to another.

DETAILED DESCRIPTION

Figure 1:
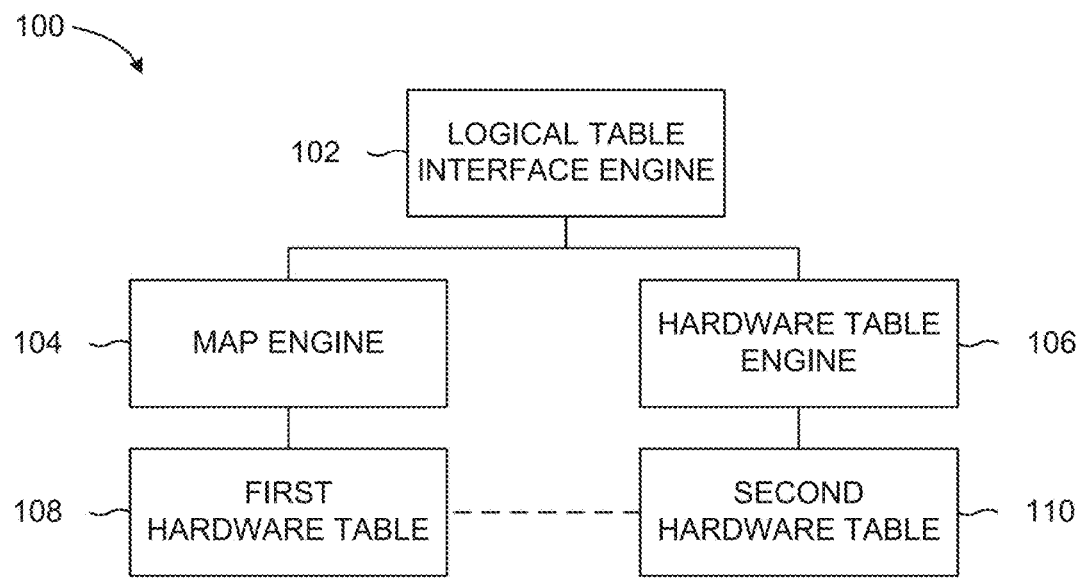
FIGS. 1-3 are block diagrams depicting example systems for maintaining a flow pipeline.

In the following description and figures, some example implementations of apparatus, systems, and/or methods for maintaining a flow pipeline are described. As used herein, the flow pipeline refers to the path a frame or packet takes through a network element. The flow pipeline may be affected by the order of the hardware tables and the tasks performed in processing the hardware tables.

Some examples herein are described specifically for use in a software-defined network (SDN) environment. SDN-compatible networks may provide a service or multiple services to devices or other networks. A service may be any appropriate supplying of communication, transmissions, software, storage, or any other product or activity that may be capable of running on a network of devices, or network elements. SDN-compatible networks abstract the hardware of the system from the services being provided. For example, an SDN network can decouple the traffic control decisions from the physical network elements that forward the network traffic.

Some example switches of an SDN network expose a fixed set of hardware tables, such as ternary content addressable memory (TCAM) hardware tables and hash hardware tables, to receive SDN flow information. A controller over the SDN network may query a switch about table capabilities including the number of fixed tables of the switch and the fixed tables are able to be used by the controller or an application executing on the controller, such as an SDN application. The controller and/or the application may manage a logical flow table, such as an OPENFLOW table. In that situation, the logical flow tables may coincide with the hardware tables. For example, the number of logical flow tables may be equal to the number of hardware tables and the size of the logical flow tables may be restricted to the size of the hardware table. In this manner, the controller and/or SDN applications may be restricted in optimizing usage of hardware table and may be unable to adapt the flow pipeline to the particular requirements of the controller and/or SDN application.

Various examples described below relate to managing hardware tables using a map table. By allocating one of the hardware tables of a network element to a map table, the map table can refer to other hardware tables with logical table information and hardware tables may be allocated, rearranged, and/or deallocated using the map table entries and may, for example, avoid some complex entry changes of the hardware tables.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, update, manage, modify, and/or otherwise keep in an appropriate condition."

Figure 2:
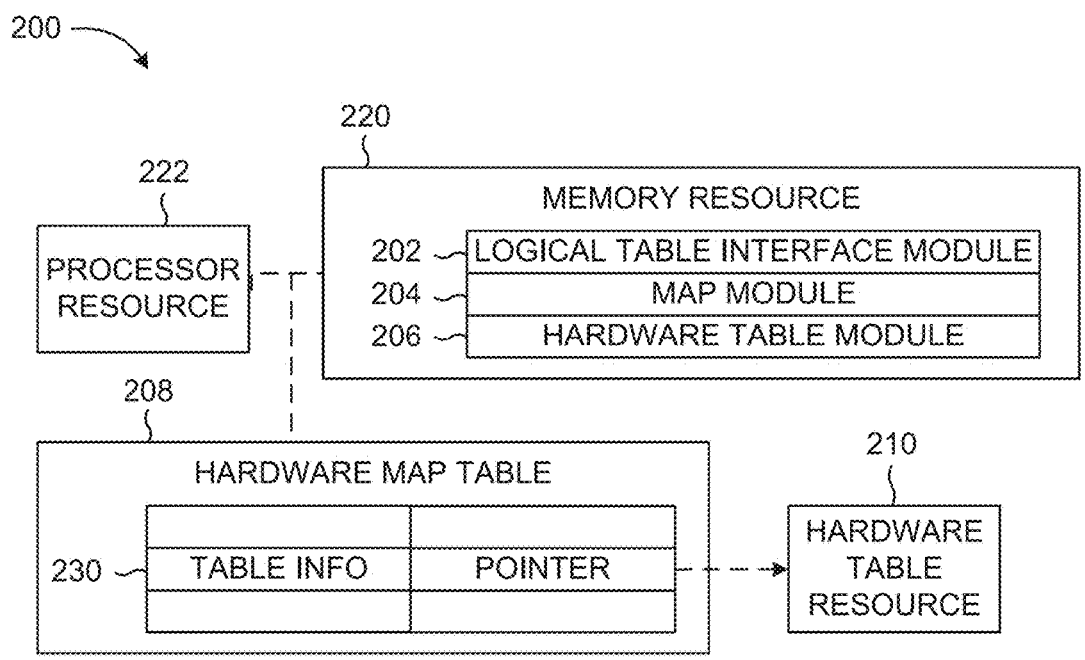
Figure 3:
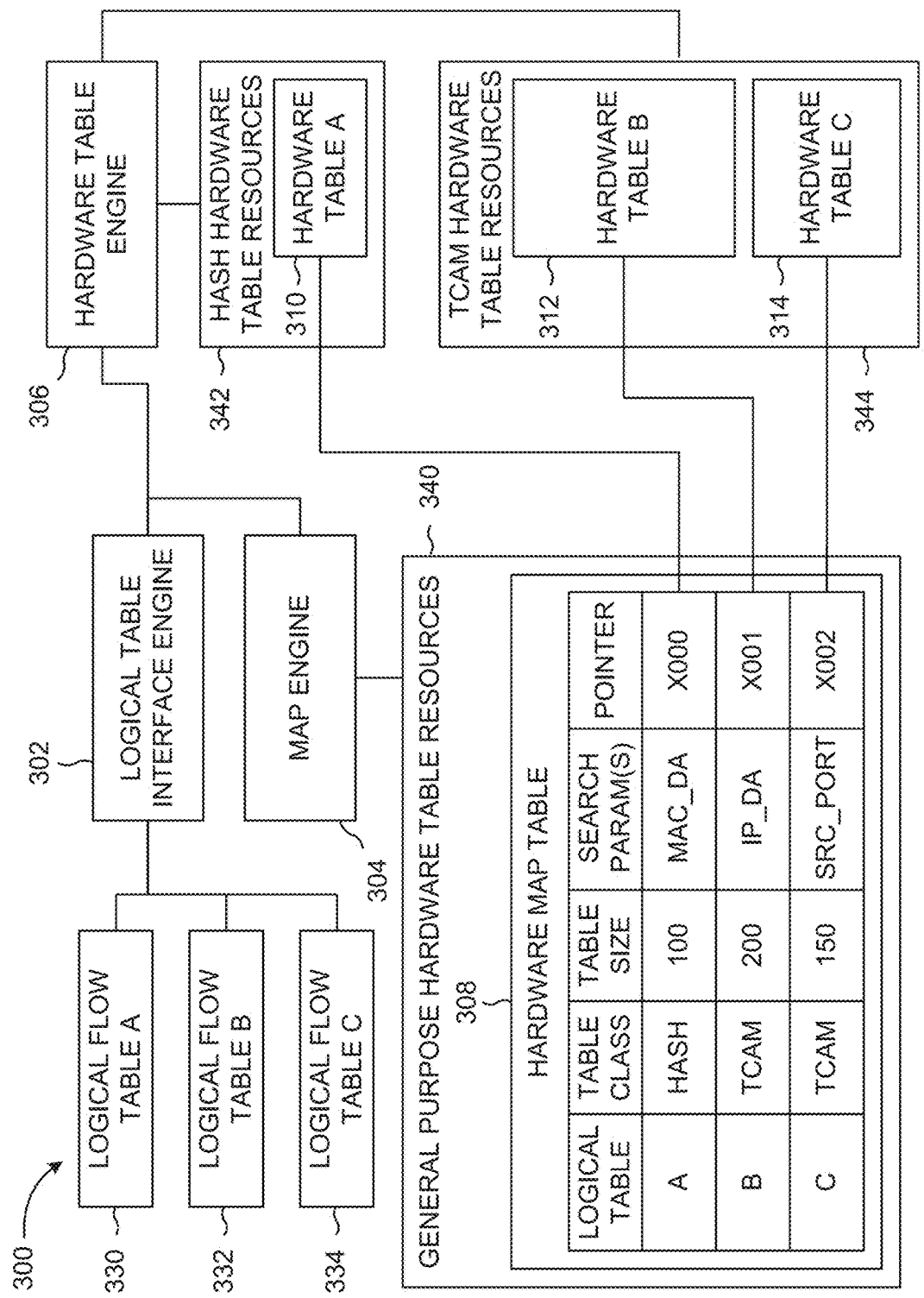

FIGS. 1-3 are block diagrams depicting example systems 100, 200, and 300 for maintaining a flow pipeline. Referring to FIG. 1, the example system 100 for maintaining a flow pipeline of FIG. 1 generally includes a logical table interface engine 102, a map engine 104, and a hardware table engine 106. In general, the map engine 104 maintains a first hardware table 108 representing the flow pipeline that includes a reference to the second hardware table 110, where the map engine 104 maintains the flow pipeline based on input received via the logical table interface engine 102. The dotted line of FIG. 1 represents a relationship between the first hardware table 108 and the second hardware table 110, such as a pointer in an entry of the first hardware table 108 with a reference to the second hardware table 110.

The logical table interface engine 102 represents any circuitry or combination of circuitry and executable instructions to receive a maintenance request regarding a flow pipeline of a network element. For example, the logical table interface engine 102 may represent a combination of circuitry and executable instructions to expose an interface, such as an application programming interface (API), to receive a maintenance request to add a hardware table to the flow pipeline. The flow pipeline may include "stops" at multiple hardware tables of the network element. As discussed herein, the system 100 may guide the flow pipeline to a particular hardware table via a map table with entries corresponding to hardware tables of the network element.

The flow pipeline of a network element is affected by the number, sizes, and order of the hardware tables of the network element and a maintenance request is an operation that may affect one of those characteristics of the hardware tables. Example types of maintenance requests received by the logical table interface engine 102 may include an add table request, a remove table request, a modify table request, and an order table request. As indicated by their names, an add table request is a request to add a table to the flow pipeline, a remove table request is a request to remove a table from the flow pipeline, a modify table request is a request to modify a table of the flow pipeline, and an order table request is a request to set an order of the hardware tables in the flow pipeline. The maintenance request may contain a set of parameters based on the type of request. For example, a remove request may include an identifier of the table to remove from the pipeline. For another example, an add request may include a logical table number and table information.

Example parameters of a maintenance request include a table identifier, a table class, a table size, a search parameter, a return data class, or any other properties of a table. A table identifier represents any value, number, character, string, or other data structure capable of identifying a table, such as a logical table number. A table class represents a data structure capable of indicating a type of hardware table. Example table classes include a hash hardware table, a TCAM hardware table, a direct lookup hardware table, a group table, a pattern matching hardware table, and a general purpose hardware table. A table size represents a number of entries of a table. A return data class represents the type of data to be returned from the maintenance request. A search parameter represents a criterion or a combination of criteria used to search or lookup an entry in a table. Example search parameters may include an ingress port, a media access control (MAC) destination address, a MAC source address, an internet protocol (IP) type, an IP source address, an IP destination address, a virtual local area network (VLAN), a class of service (COS), an ETHERNET type, a transmission control protocol or user datagram protocol (TCP/UDP) source port, a TCP/UDP destination port, metadata, or a combination thereof.

The map engine 104 represents any circuitry or combination of circuitry and executable instructions to maintain an entry of a map table based on an action of the maintenance request associated with a logical flow table. As used herein, an action is the type of operation to perform on the network element to modify the flow pipeline. As used herein, map table represents a table data structure that contains entries for each hardware table of the network element. The map table may reside on or otherwise be allocated to a hardware table of the network element. For example, a network element may reserve a hardware table, such as a general purpose hardware table, as a map table while the other hardware tables of the network element may be used for flow entries of the logical flow tables for the network. As used herein, an entry is a data structure, such as a row in the map table, with information of a hardware table of a network element. An entry comprises a table reference (e.g., a reference pointer) to the corresponding hardware table in the network element resources and table information related to a logical flow table. The table information may comprise the attributes of the hardware table. For example, the table information may comprise a table class (e.g., a general purpose table, a hash table, or a TCAM table) and a table size (e.g., a number of entries, a number of memory addresses, or a percentage of a hardware table resource pool). For another example, the table information may comprise any of the parameters discussed herein with regards to the maintenance requests and/or the logical flow tables, such as a logical table number and a search parameter.

For yet another example, the entry may contain a table counter and a plurality of parsers. The table information may be used by the system 100 to maintain or otherwise facilitate the flow pipeline via the map engine 104. For example, the map engine 102 may rearrange the entries of the map table based on the table counters of the entries, such as to place the tables with more access to the beginning of the flow pipeline. For another example, the map engine 104 may build a key associated with a hardware table based on the plurality of parsers and place the key in a key field of the entry in the map table.

Each entry in the map table may be associated with a logical flow table and the table reference (e.g., pointer) may be supplied during a flow pipeline execution request (e.g., a flow entry lookup in the flow tables of the network element when a packet is received at the network element). In this manner, the table order of the flow pipeline may be maintained and changes in the logical flow tables may be accommodated. For example, the table order of the flow pipeline may be maintained by arranging the entries of the map table, such as arranging the map table entries in the desired order of the logical flow tables as indicated in the maintenance request. For another example, the changes in the logical flow table may be propagated to the hardware tables via the table information in the map table entries as discussed further below with regards to the hardware table engine 106.

The hardware table engine 106 represents any circuitry or combination of circuitry and executable instructions to maintain a hardware table of the network element based on an entry in the map table. For example, the hardware table engine 106 may be a combination of circuitry and executable instructions to allocate and/or deallocate hardware table resources (e.g., memory resources) of the network element according to the table information. The table information of an entry is used to identify a set of attributes of the hardware table and allocate resources of the network element appropriately. For example, the map table may include an entry for a TCAM table with a particular size and the hardware table engine 106 may identify the set of attributes of the network resources, such as the TCAM memory resource location and the section of the TCAM memory resource to allocate to the hardware table.

The hardware table engine 106 may identify a memory resource class based on a table class parameter of the maintenance request. For example, the hardware table engine 106 may allocate a section of a memory resource of the network element for the hardware table based on the memory resource class (e.g., hash, general purpose, lookup, or TCAM class) as indicated by the table class parameter of the maintenance request. The section of the memory resource may be based on the entry size parameter of the maintenance request (e.g., the number of entries of the logical flow table).

The hardware table engine 106 may change an attribute of the hardware table as the table information changes in the map table (which may change based on changes to the logical flow table corresponding to the entry). For example, the hardware table engine 106 may, in response to a table modify request having a table size parameter, change a size of the section of the memory resource of the hardware table in accordance with a change of the table information in the entry (which may change as the size of the logical flow table changes).

The resources of the network element are maintained as pools of resources. For example, the network element may include two, fixed hash hardware tables and three, fixed TCAM hardware tables. In that example, the map table allows the two hash tables to act as a single pool of hash table resources that may be allocated dynamically to a plurality of hash tables that may be different than the original number of fixed tables. Similarly in that example, the three TCAM tables are to act as a pool of TCAM table resources that are allocatable into a number of TCAM hardware tables that may not be related to the original number of fixed tables, such as five TCAM hardware tables. This may be enabled, for example, by using the reference pointers and a table size in the map table entries to designate sections of the hardware table resources. The resource pools may be, for example, dynamically divided up into equal or various sizes based on the sizes of the logical flow tables being supported by the network element. A network switches may be adapted for use with the system 100, for example, by designating one of the fixed hardware tables as a map table and adding an entry in the map table that corresponds to a hardware table when a logical flow table is added, removing an entry in the map table that corresponds to a hardware table when a logical flow table is removed, modifying table information of an entry that corresponds to a hardware table when a logical flow table is modified, etc. In this manner, the map table of the network element may, for examples, maintain the flow pipeline in a flexible manner and keep lookup functionality relatively fast.

The map table may maintain the order and the logical view of the flow pipelines, such as by using the structural order of the entries in the map table. For example, map table entry zero may store the pointer to the initial table in the pipeline, map table entry one may store the pointer to the next table in the pipeline, and so on so that map table entry N may store the pointer to the Nth table in the pipeline. In this manner, executing the flow pipeline becomes an operation of going through the map table, fetching a pointer of the hardware tables at an entry in the map table, performing the lookup to the hardware table at the destination of the pointer, and returning to the next entry in the map table to fetch the pointer of the next hardware table.

Figure 4:
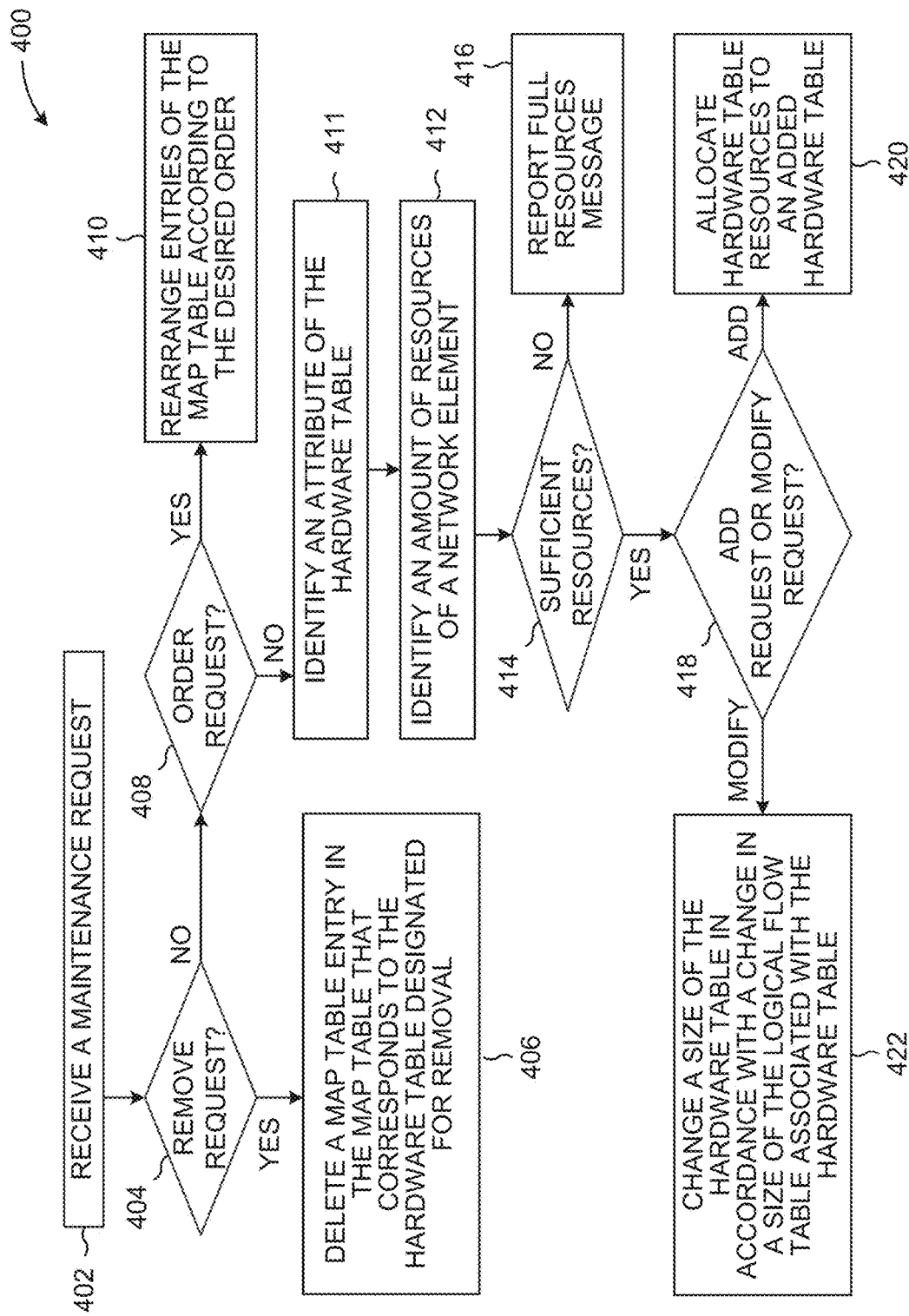
FIGS. 4 and 5 are flow diagrams depicting example methods for maintaining a flow pipeline.
Figure 5:
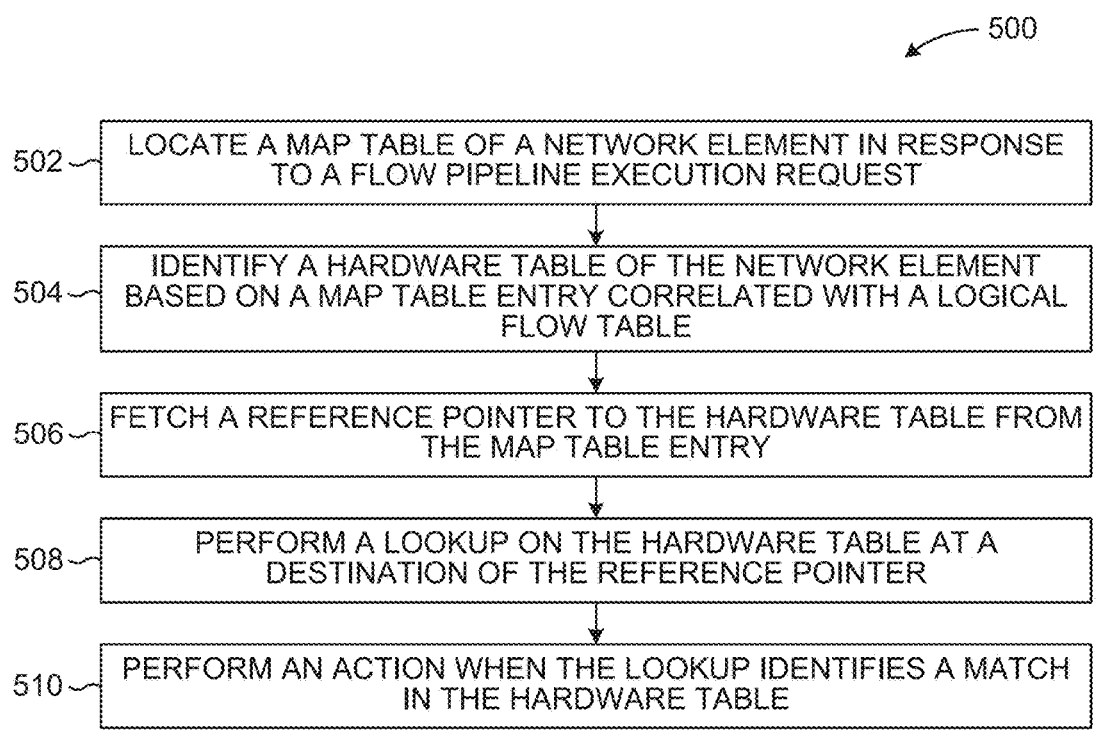

In some examples, functionalities described herein in relation to any of FIGS. 1-3 may be provided in combination with functionalities described herein in relation to any of FIGS. 4-5.

FIG. 2 depicts the example system 200 can comprise a memory resource 220 operatively coupled to a processor resource 222. The processor resource 222 can be operatively coupled to hardware map table 208, which may comprise (e.g., be located in) a non-transitory, machine-readable storage medium. The hardware map table represents a map table existing on a table in the hardware (e.g., circuitry) of the network element. For example, a network switch may comprise particular circuitry for a memory resource, such as a TCAM, to implement a table and facilitate lookup in the circuitry in a particular method. The hardware map table 208 may be the same as the first hardware table 108 of FIG. 1. The hardware table resource 210 may comprise the second hardware table 110.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a logical table interface module 202, a map module 204, and a hardware table module 206. The logical table interface module 202, the map module 204, and the hardware table module 206 represent program instructions that when executed function as the logical table interface engine 102, the map engine 104, and the hardware table engine 106 of FIG. 1, respectively. The processor resource 222 can carry out a set of instructions to execute the modules 202, 204, 206, and/or any other appropriate operations among and/or associated with the modules of the system 200. For example, the processor resource 222 may carry out a set of instructions to identify attributes of a logical flow table from a first request to create a hardware table corresponding to the logical flow table, add an entry into a hardware map table of a network element, allocate a hardware table resource of the network element based on the attributes of the logical flow table, and supply reference pointer to a hardware table resource from the entry of the hardware map table upon a second request for access to the logical flow table. For another example, the processor resource 222 may carry out a set of instructions to identify a location in an order of entries in the hardware map table 208 to place the entry 230 based on a desired order of execution of a plurality of hardware tables of the network element indicated by the first request and execute a flow pipeline based on the order of entries in the hardware map table. For yet another example, the processor resource 222 may carry out a set of instructions to designate a section of the hardware table resource 210 for the hardware table associated with the logical flow table, dynamically identify the section of the hardware table resource 210 between a first memory address and a second memory address based on a size of the logical flow table associated with the hardware table, and update a table entry size field of the entry 230 based on the size of the logical flow table. The entry 230 may include table information associated with attributes of the logical flow table, such as the size of the logical flow table.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

A processor resource, such as the processor resource 222 of FIG. 2, is any appropriate circuitry capable of processing (e.g., computing) instructions, such as one or multiple processing elements capable of retrieving instructions from a memory resource, such as the memory resource 220, and executing those instructions. For example, the processor resource 222 can be a central processing unit ("CPU") that enables flow pipeline maintenance by fetching, decoding, and executing modules 202, 204, and 206. Example processor resources include at least one CPU, a semiconductor-based microprocessor, a programmable logic device ("PLD"), and the like. Example PLDs include an application specific integrated circuit ("ASIC"), a field-programmable gate array ("FPGA"), a programmable array logic ("PAL"), a complex programmable logic device ("CPLD"), and an erasable programmable logic device ("EPLD"). A processor resource can include multiple processing elements that are integrated in a single device or distributed across devices. A processor resource can process the instructions serially, concurrently, or in partial concurrence.

A memory resource, such as the memory resource 220 and the hardware table resource 210 of FIG. 2, represents a medium to store data utilized and/or produced by the system 200. For example, the memory resource 220 may contain information utilized by the engines 102, 104, and 106 of FIG. 1. The medium is any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. A memory resource can be said to store program instructions that when executed by a processor resource cause the processor resource to implement functionality of the system 200 of FIG. 2. The memory resource 220 can be integrated in the same device as the processor resource 222 or it can be separate but accessible to that device and the processor resource 222. The memory resource 222 may be distributed across devices. The memory resource 220 and the hardware table resource 210 can represent the same physical medium or separate physical media. The data of the hardware table resource 210 and/or hardware map table 208 can include representations of data and/or information mentioned herein.

In the discussion herein, the engines 102, 104, and 106 of FIG. 1 and the modules 202, 204, and 206 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the system 200 can include the executable instructions can be part of an installation package that when installed can be executed by a processor resource to perform operations of the system 200, such as methods described with regards to FIGS. 4 and 5. In that example, the memory resource can be a portable medium such as a compact disc, a digital video disc, a flash drive, or memory maintained by a compute device, such as a service device, from which the installation package can be downloaded and installed. In another example, the executable instructions can be part of an application or applications already installed. A memory resource can be a non-volatile memory resource such as read only memory ("ROM"), a volatile memory resource such as random access memory ("RAM"), a storage device, or a combination thereof. Example forms of a memory resource include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

FIG. 3 depicts an example system 300 for maintaining a flow pipeline can be implemented. The system 300 may include a logical table interface engine 302, a map engine 304, and a hardware table engine 306 that are the same as the logical table interface engine 102, the map engine 104, and the hardware table engine 106 of FIG. 1, respectively, and the associated descriptions are not repeated in their entirety. As shown in FIG. 3, the engines 302, 304, and 306 may be integrated into a compute device, such as a network element. For example, the engines 302, 304, and 306 may be integrated via circuitry or as installed instructions into a memory resource of a network switch.

Referring to FIG. 3, logical flow tables 330, 332, and 334 are depicted. The logical flow tables 330, 332, and 334 represent logical representations of flows of the network as represented in a combination of circuitry and executable instructions, such as a SDN application executing on an administrative compute device. In the example of an SDN application for managing the flow table, the logical table interface engine 302 may be an interface, such as an API, to facilitate operation of instructions executed by the SDN application to manage physical hardware tables of a network element via a map engine 304 and a hardware table engine 306.

The map engine 304 may generally manage general purpose hardware table resources 340 to maintain a hardware map table 308, which may be the same as the first hardware table 108. The hardware table engine 306 may generally manage the hardware table resources 342 and 344 to maintain hardware tables 310, 312, and 314 based on the entries in the hardware map table (which corresponds with table information of the logical flow tables 330, 332, and 334. In the example of FIG. 3, logical flow table A 330 corresponds with hardware table A 310, logical flow table B 332 corresponds with hardware table B 312, and logical flow table C 334 corresponds with hardware table C. In the example of FIG. 3, the hardware map table 308 may execute the flow pipeline in the order of the hardware map table which would include looking at the hardware table A, then hardware table B, and finally hardware table C. As discussed herein, to change the order of the flow pipeline to look at the entries the logical flow table A last, for example, the entry associated with logical table A can be moved to the last entry in the hardware map table to allow for the next flow access request to look at hardware tables B and C before looking at hardware table A.

An example of hardware map table entries are depicted in FIG. 3. The example hardware map table includes data representing logical tables, table class, table size, search parameters, and a pointer, where the logical table identifier, the table class, the search parameters, and the table size are table information as discussed herein. As depicted, table classes may be hash hardware tables or TCAM hardware tables, which may be part of separated hash hardware table resources 342 and TCAM hardware table resources 344. For example, hardware table 310 may include all or a portion of the available hash hardware table resources. The table size may vary within the capacity of the hardware table resources 342 and 344. For example, the TCAM hardware table resources may host two tables, such as hardware table 312 and hardware table 314, with one table having 200 entries and another having 150 entries (the number of entries are used for simplicity). A hardware table resource may include a single physical hardware table or multiple physical hardware tables that are managed as single pool (or multiple pools) of hardware table resources and divided by the map engine 304 (e.g., via pointers and/or table information, such as the table size, in the entries of the hardware map table 308). The example search parameters depicted in the "search param(s)" column of the map table include MAC_DA, IP_DA, and SRC_PORT, which represent example parameters of a MAC destination address, an IP destination address, and a source port (such as a TCP/UDP source port), respectively. As discussed herein, the search parameters may be a single parameter or a combination of parameters used to perform a lookup in a table.

A connection among blocks indicates an operable interconnect to allow for functionality described herein. For example, the connections may represent one or a combination of an electrical element, a circuit, a cable, wireless connection, fiber optic connection, or remote connections via a telecommunications link, an infrared link, a radio frequency link, or any other connectors of systems that provide electronic communication. The connection may include, at least in part, intranet, the Internet, or a combination of both. The connection may also include intermediate proxies, routers, switches, load balancers, and the like.

Referring to FIGS. 1-3, the engines 102, 104, and 106 of FIG. 1, the modules 202, 204, and 206 of FIG. 2, and/or the engines 302, 304, and 306 can be distributed across network elements, such as a switch, a router, a controller, or a combination thereof. The engine and/or modules can complete or assist completion of operations performed in describing another engine and/or module. For example, the hardware table engine 306 of FIG. 3 can request, complete, or perform the methods or operations described with the hardware table engine 106 of FIG. 1 as well as the logical table interface engine 102 and the map engine 104 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 can perform example methods described in connection with FIGS. 4 and 5.

FIGS. 4 and 5 are flow diagrams depicting example methods 400 and 500 for accomplishing a flow pipeline. Referring to FIG. 4, example method 400 for maintaining a flow pipeline can generally comprise receiving a maintenance request, determining the maintenance action class, and performing the maintenance action according to the maintenance request.

At block 402, a maintenance request is received. The maintenance request may be any appropriate request to maintain the network element to establish a flow pipeline. For example, a maintenance request may include a request to remove a logical flow table from the flow pipeline, change the order of the logical flow tables in the flow pipeline, add a logical table to the flow pipeline, modify an existing table in the flow pipeline, or a combination thereof. Another example maintenance request (not shown in FIG. 4) is an update request to update an entry in a hardware table in accordance with an update in an entry of a logical flow table.

If it is determined that the maintenance request is a remove request at block 404, then a map table entry that corresponds to the hardware table designated for removal (i.e., the hardware table corresponds to the logical flow table associated with the remove request) is deleted to remove the logical flow table (that corresponds to the hardware table) from the flow pipeline. In that example, the deallocated resources of the hardware table of the removed logical table are made available to use in a future maintenance request, such as adding a table or enlarging a present table to accommodate more flow entries by allocating the previously used hardware table resources of the network element to the future maintenance request.

If it is determined that the maintenance request is an order request at block 408, then entries of the map table are rearranged at block 410 according to the desired order indicated by the maintenance request. In this example manner, the rearrangement of a flow pipeline order may be done by swapping entries in the map table to change an order of the flow pipeline rather than, for example, moving entries of one hardware table to another hardware table and may, for example, reduce the resource and operations used by the network element to update the flow pipeline.

The maintenance request may allocate a resource of the network element. For example, an add request or a modify request may utilize resources of the network element that may not already be provisioned. At block 411, an attribute of the hardware table is identified. The attribute can be identified as a parameter of the maintenance request, where the parameter of the maintenance request corresponds to an attribute of a logical table that corresponds to the hardware table. For example, the maintenance request can be an add request where the add request includes the table information associated with a logical table and a system for maintaining the flow pipeline allocates hardware resources to a hardware table based on the table information (e.g., the table information of the logical flow table is to correspond with the table information of the hardware table). At block 412, an amount of resources of the network element are identified. For example, the amount of used resources and the amount of available resources of the network element may be identified. If it is determined that a sufficient amount of resources are not available from the network element at block 414, then a full resources message is reported at block 416 to indicate that the maintenance request is not able to complete due to insufficient resources on the network element. This may happen, for example, when a request to add a hardware table is made when all the resources of the network element are already allocated to hardware tables or an insufficient amount of resources are available to accommodate a new hardware table. In that case, the administrator may request a remove maintenance request to remove enough hardware table(s) (or reduce the hardware table sizes used in a modify request at block 420) to make sufficient number of resources available to complete the add request.

A determination as to whether the request is an add request or a modify request is made at block 418. An add request is a maintenance request to add a hardware table when a logical flow table is added. A modify request is a maintenance request to change a hardware table associated with a change in a logical flow table.

At block 420, if it is determined that the maintenance request is an add request, then hardware table resources are allocated to an added hardware table that corresponds to an added logical flow table. In that example, the map table is updated with an added map table entry at the desired location of the entry in the order of the flow pipeline. If it is determined that the maintenance request is a modify request, a size of the hardware table is changed, at block 422, in response to a change in the map table entry, where the map table entry is changed in accordance with a change in a size of the logical flow table associated with the hardware table as indicated by the maintenance request received at block 402. In that example, the size data of the table information in the map table entry is updated to the changed size. For example, the address of the destination of the reference pointer may change and/or a section of memory pointed to by the reference pointer may be increased.

FIG. 5 depicts an example method 500 for accomplishing a flow pipeline. An example method of accomplishing a flow pipeline may comprise a method 400 of maintaining the flow pipeline before performing a lookup in hardware and, therefore, the description of FIG. 4 may be incorporated into the description of FIG. 5 as well for some examples.

At block 502, a map table of a network element is located in response to a flow pipeline execution request. For example, a map table may be located as the initial table reviewed in a lookup request and from the map table, the network pipeline may be guided to the appropriate hardware table, as discussed below. In this manner, a map table can act as a flow pipeline manager, and, for example, may guide a flow request to a hardware table with a greater likelihood of finding the matching flow faster (e.g., based on statistically-based arrangement of the hardware tables) than network elements that do not implement the method(s) described herein.

At block 504, a hardware table of the network element is identified based on a map table entry correlated with a logical flow table. For example, the map table may be looked at in order of the entries of the map table until an entry corresponding to a logical table is found, such as a comparison of the search parameters of the flow request to identify a flow table entry may be used to indicate which table is being searched for. In this manner, maintenance to the map table corresponds with changes to the flow pipeline and may, for example, avoid large operations of moving entries among hardware tables.

At block 506, a reference pointer to the hardware table (e.g., a memory address pointer that references a section of a memory resource for the hardware table) is fetched from the map table entry. For example, once a matching entry in the map table is located, a reference pointer in a reference pointer field of the map table entry may be retrieved by a processor resource of the network element.

At block 508, a lookup on the hardware table at a destination of the reference pointer is performed. For example, the reference pointer retrieved at block 506 is followed to a destination representing a hardware table and a lookup is performed starting at that destination address (e.g., an initial entry of the hardware table corresponding to the logical flow table).

At block 510, an action is performed when the lookup identifies a match in the hardware table. For example, once a match in the hardware table is identified, an action associated with the matched flow entry is performed, such as sending the flow request to a particular port.

Although the flow diagrams of FIGS. 4 and 5 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract, and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
  a logical table interface engine to receive a maintenance request regarding a flow pipeline of a network element;
  a map engine to maintain an entry of a first hardware table based on an action of the maintenance request associated with a logical flow table, the first hardware table designated for a map table, wherein the entry is to comprise:
    a table reference to a second hardware table; and
    table information related to the logical flow table, the table information comprising a table class and a table size; and
  a hardware table engine to maintain the second hardware table of the network element based on the entry in the first hardware table, the second hardware table having a set of attributes including the table information.

2. The system of claim 1, wherein the hardware table engine is further to:
  identify a memory resource class based on a table class parameter of the maintenance request; and
  allocate a section of a memory resource of the network element for the second hardware table of the table class parameter based on the memory resource class and an entry size parameter of the maintenance request.

3. The system of claim 2, wherein the maintenance request is a table modify request and the hardware table engine is further to:
  change a size of the section of the memory resource in accordance with a change of the table information in the entry.

4. The system of claim 1, wherein:
  the table information further comprises a logical table number and a search parameter; and
  the table class is one of a general purpose table, a hash table, and a ternary content addressable memory ("TCAM") table.

5. The system of claim 1, wherein the entry further comprises a plurality of parsers and the map engine is further to:
  build a key associated with the second hardware table based on the plurality of parsers; and
  place the key in a key field of the entry in the first hardware table.

6. The system of claim 1, wherein the map engine is further to:
  maintain a table order of the flow pipeline by arranging entries of the first hardware table.

7. The system of claim 6, wherein the entry further includes a table counter and the map engine is to:
  rearrange the entries of the first hardware table based on the table counter.

8. A non-transitory computer-readable storage medium comprising a set of instructions executable by a processor resource to:
  identify attributes of a logical flow table from a first request to create a hardware table corresponding to the logical flow table;
  add an entry into a hardware map table of a network element, the entry to include table information associated with the attributes of the logical flow table;
  allocate a hardware table resource of the network element based on the attributes of the logical flow table; and
  supply a reference pointer from the entry of the hardware map table upon a second request for access to the logical flow table, a destination of the reference pointer being the hardware table resource.

9. The medium of claim 8, wherein the set of instructions is executable by the processor resource to:
  identify a location in an order of entries in the hardware map table to place the entry based on a desired order of execution of a plurality of hardware tables of the network element indicated by the first request; and
  execute a flow pipeline based on the order of entries in the hardware map table.

10. The medium of claim 8, wherein the set of instructions to allocate the hardware table resource is executable by the processor resource to:
  designate a section of the hardware table resource for the hardware table associated with the logical flow table, the hardware table resource being a memory resource;
  dynamically identify the section of the hardware table resource between a first memory address and a second memory address based on a size of the logical flow table associated with the hardware table; and
  update a table entry size field of the entry based on the size of the logical flow table.

11. A method for accomplishing a flow pipeline comprising:
- locating a map table of a network element in response to a flow pipeline execution request;
- identifying a hardware table of the network element based on a map table entry correlated with a logical flow table;
- fetching a reference pointer to the hardware table from the map table entry;
- performing a lookup on the hardware table at a destination of the reference pointer; and
- performing an action when the lookup identifies a match in the hardware table.

12. The method of claim 11, comprising:
- identifying an attribute of the hardware table based on a parameter of a maintenance request; and
- identifying an amount of resources available from the network element.

13. The method of claim 11, comprising:
- changing a size of the hardware table in response to a change in the map table entry in accordance with a change in a size of the logical flow table associated with the hardware table.

14. The method of claim 11, comprising:
- changing an order of the flow pipeline by rearranging entries of the map table.

15. The method of claim 11, comprising:
- removing the logical flow table that corresponds to the hardware table from the flow pipeline by deleting the map table entry in the map table that corresponds to the hardware table; and
- allocating hardware table resources of the network element designated to the removed hardware table to an added hardware table.

* * * * *